Aug. 2, 1955 L. V. LOCKE 2,714,476
LIQUID DISPENSERS
Filed March 20, 1953 2 Sheets-Sheet 1
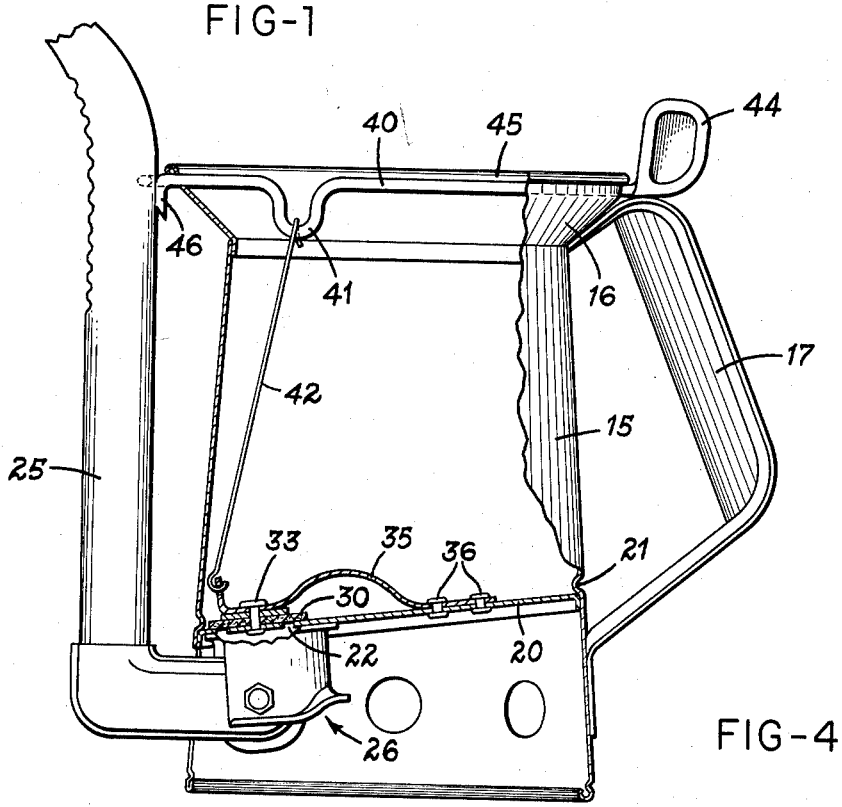
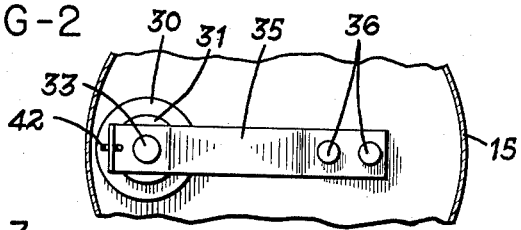
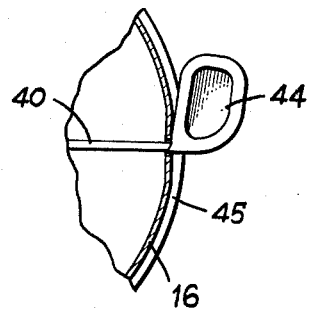
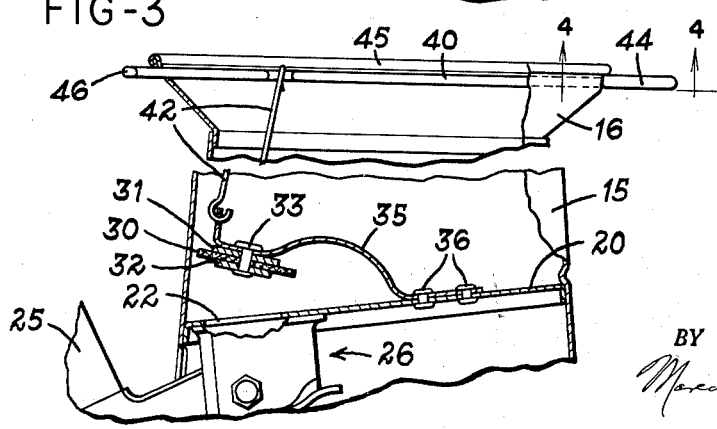
*INVENTOR.*
LOYAL V. LOCKE
BY
ATTORNEYS

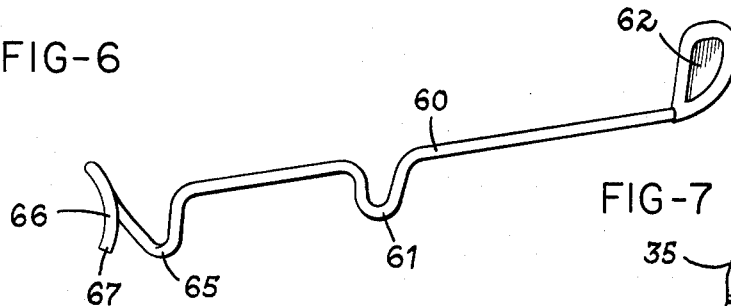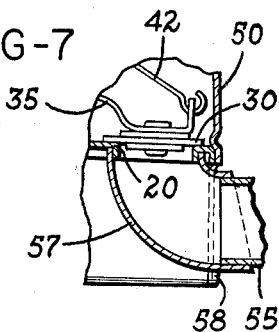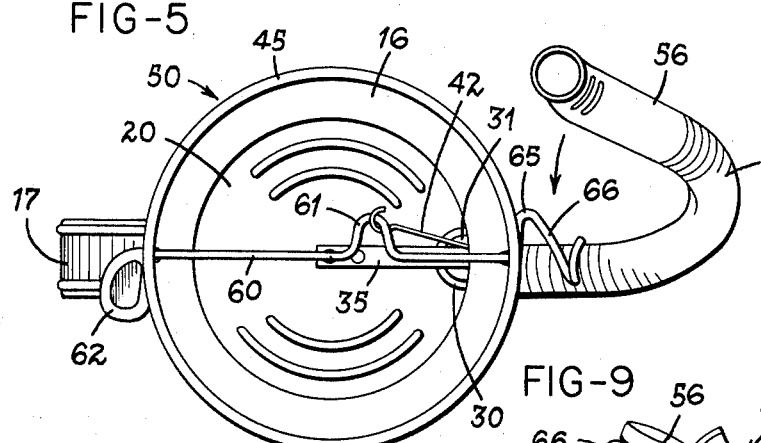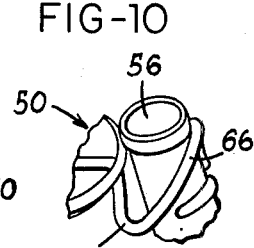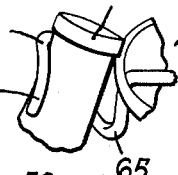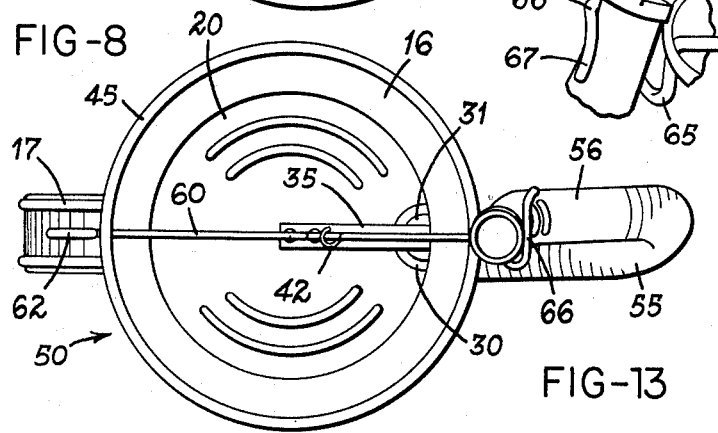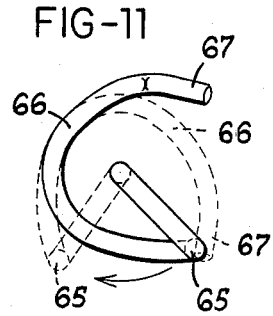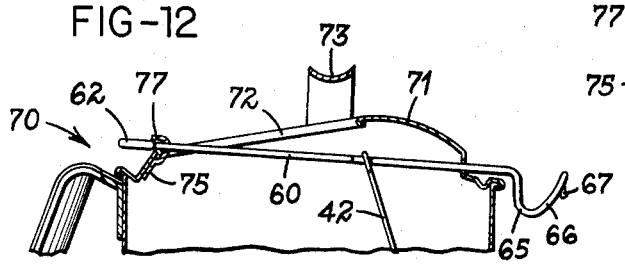

United States Patent Office

2,714,476
Patented Aug. 2, 1955

2,714,476

LIQUID DISPENSERS

Loyal V. Locke, Delphos, Ohio, assignor to The Huffman Manufacturing Company, Dayton, Ohio, a corporation of Ohio Application March 20, 1953, Serial No. 343,646

9 Claims. (Cl. 222—508)

This invention relates to liquid dispensers of the type commonly used for fluids such as oil and anti-freeze in garages, service stations and the like.

The invention has special relation to devices for dispensing a measured volume of bulk liquid and in which the casing receiving the liquid contents for dispensing is provided with a valved discharge outlet having a flexible or hinged delivery spout therebelow for insertion in the fill spout of the automobile engine, radiator or the like. The present invention is especially directed to the provision of a measuring dispenser of this general type which is of simplified overall construction facilitating fabrication thereof at economical cost and which is also considerably more rugged than the devices of this character previously available in the art as well as simpler to use and maintain and more positive in operation.

One of the primary objects of the invention is to provide a liquid measure of the above type embodying a valve for closing the discharge outlet which is spring biased to its closed position, which is responsive to an upward pull against the spring to open the discharge outlet, and which is equipped with an operating member mounted in the upper end of the measure for rotation on a substantially horizontal axis to exert an upward opening pull on the valve.

An additional object is to provide such a measure wherein the main casing and the operating member for the valve include portions which cooperate to lock the valve in its open positon and which are readily movable into locking relation by the thumb or finger of the hand of the user carrying the measure.

It is also an object of the invention to provide a valve operating mechanism for a measuring dispenser as outlined above which is equally adapted to a casing having either a flexible discharge spout or a hinged rigid spout and wherein the operating member for the valve includes a portion cooperating with the spout to release the locking portion of the operating member upon movement of the spout to its normal inoperative position.

Other objects and advantages of the invention will be apparent from the following description, the accompanying drawings and the appended claims.

In the drawings:

Fig. 1 is a view partly in side elevation and partly in vertical section showing a measuring dispenser constructed in accordance with the invention and provided with a hinged rigid spout;

Fig. 2 is a fragementary plan view of the valve in the dispenser of Fig. 1;

Fig. 3 is a fragmentary view similar to Fig. 1 showing the valve and its operating mechanism in the open position of the valve;

Fig. 4 is a fragmentary section on the line 4—4 of Fig. 3;

Fig. 5 is a plan view of a measure constructed in accordance with the invention and provided with a flexible discharge spout, the valve being shown in open position with the spout released for use;

Fig. 6 is a perspective view of the operating crank for the measure of Fig. 5;

Fig. 7 is a fragmentary view showing the connection between the flexible spout and the measure of Fig. 5;

Fig. 8 is a view similar to Fig. 5 showing the valve in closed position and the spout in its normal inoperative position;

Figs. 9 and 10 are fragmentary views in perspective illustrating from different angles the position of the free end of the spout of Fig. 7 in its inoperative retained relation with the operating crank for the valve;

Fig. 11 is a front elevational view of the end portion of the operating crank of Fig. 6 which projects beyond the front of the case;

Fig. 12 is a fragmentary sectional view showing a different construction of casing for a measure constructed in accordance with the invention and equipped with a flexible spout; and Fig. 13 is a detail perspective view of a part of the casing of Fig. 12.

Referring to the drawings, which illustrate preferred embodiments of the present invention, Fig. 1 show a dispensing measure wherein the main casing 15 is of generally frusto-conical shape and is provided with a funnel-shaped top 16 and the usual carrying handle 17. The bottom of the casing is formed by a plate 20 soldered within the casing in forwardly tilted position above the bottom end of the casing, the casing wall being provided with an internal bead 21 for locating the bottom 20 in proper position. The discharge opening 22 for the contents of the unit is formed in the bottom 20 at the front of the casing, and a rigid spout 25 is secured to the bottom 20 below discharge opening 22, the mounting connection for the spout 25 being indicated at 26 as of the hinged type shown in Vahle Patent No. 2,067,554, issued January 12, 1937, to the assignee of this application.

The valve controlling the discharge outlet 22 is shown as a disk 30 of leather or other suitable material provided with a pair of reinforcing washers 31 and 32 and secured by a rivet 33 to a leaf spring 35 mounted as by means of a pair of rivets 36 on the bottom plate 20 of the casing. The spring 35 has flattened end portions and a curved central portion, and it is proportioned to exert the proper downward biasing force on valve 30 to maintain it closed in its covering position on the outlet 22. The curved central portion of this spring, however, is readily deflected upwardly to permit the valve to be opened for discharge of the contents of the casing and the spring 35 accordingly serves both to bias the valve and also as the primary mounting and guiding means for the valve as disclosed in more detail in my copending application Serial No. 343,645 filed of even date herewith and assigned to the same assignee as this application.

The operating mechanism for the valve 30 comprises primarily a rod 40 extending through opposite sides of the casing top 16 and having a loop 41 therein which cooperates with the remainder of the rod to form a crank. A rod or wire 42 forms a link connecting the loop 41 with the up-turned forward end of the spring 35 so that when the rod 40 is rotated to raise its loop portion 41, the link 42 will exert the proper upward pulling force on spring 35 to open the valve as shown in Fig. 3.

The crank rod 40 includes an operating lever 44 at its rearward end which extends upwardly in the closed position of the valve, and this lever 44 is located above the handle 17 for ready operation by the thumb of the same hand of the user which carries the measure. Opening of the valve requires only about 90° rotation of the crank, and simple means are provided for locking the crank in this open position of the valve. As shown, the crank is mounted for limited axial movement as well as rotational movement, and the casing top 16 includes an overturned bead 45 at its upper end which is adapted to overlap lever 44 when the crank is pushed forward after it has been rotated to the open position of the valve, this relation of the parts being shown in detail in Figs. 3 and 4. Thus to open the valve, it is only necessary for the operator to depress the lever 44 with his thumb or finger in either direction from the vertical and then to force the crank forwardly a small fraction of an inch until lever 44 engages under the bead 45.

The crank 40 also includes a portion cooperating with the spout 25 to effect automatic unlocking and closing of the valve when the spout is raised to its normal inoperative position. The forward end of the crank 40 which projects beyond the front of the case is turned over at 46 to limit rearward axial movement of the crank. When the valve is open and the crank is in its locked position, this part 46 projects beyond the bead 45 as shown in Fig. 3. Then when the contents of the measure have been dispensed, it is only necessary for the operator to swing the spout 25 upwards until it strikes the cam portion 46 of the crank, and this will drive the crank rearwardly until the lever 44 is free of bead 45. As soon as this occurs, the biasing force of spring 35 will automatically snap the crank back to its position shown in Fig. 1 and thus reclose the valve.

It will be seen that this measure construction is simple to construct, with the individual parts being of simple configuration and easily assembled. The valve unit can be riveted to the bottom plate 20 either before or after the latter is filled within the casing, and the crank rod 40 simply requires threading through the opposed holes in the casing top 16. The link 42 is then readily hooked in the spring 35 and around the loop 41, and the spring 35 thus serves the still further purpose of retaining the crank against accidental removal from the casing. At the same time, if it seems desirable for the purpose of thorough cleaning of the measure to remove the crank entirely, this is readily done by simply raising the spring 35 to permit disengagement of link 42 either from the spring or from the loop 41, after which the crank can be quickly withdrawn from the casing and quickly and easily replaced after the cleaning is completed.

Figs. 5–11 show a measure 50 of the same type as that in Figs. 1–4 except that it is provided with a flexible spout 55 in place of the rigid spout 25, and since certain of the parts in Figs. 5–11 are identical with those in Figs. 1–4, they are identified with similar reference characters in the drawings. The spout 55 is of the flexible goose neck type, and it has a rigid end portion 56 for insertion in the fill spout of the automobile engine or radiator. It may be mounted on the bottom plate 20 below discharge opening 22 by means such as an elbow 57 (Fig. 7) extending forwardly through a suitable opening 58 in the frame portion of the casing 15 below the bottom plate 20, reference being made in this connection to my copending application Serial No. 343,647 filed of even date herewith and assigned to the same assignee as this application.

The operating crank 60 for the measure 50 is generally similar to the crank 40 as described. It includes a similar loop 61 for attachment for the link 42, and also a lever portion 62 for rotation of the crank and for interlocking action with the bead 45 as shown in Fig. 5. At its forward end which projects through the casing, the crank 60 includes a cam portion 65 and also a retaining hook 66 for holding the rigid end portion 56 of the flexible spout 55 in the normal inoperative position of the spout. As best seen in Fig. 6, the tip 67 of hook 66 extends downwardly in the position of the crank wherein the valve is closed, and the remainder of the hook is formed to a general approximation of a helix to facilitate insertion and removal thereof with respect to the casing similarly to the crank 40 as described above.

In the use of this measure 50, the operator will ordinarily manually disconnect the spout end 56 from the hook 66 for insertion in the fill spout of the automobile engine or radiator, and thereafter he will rotate and lock the crank 60 in the same manner as described in connection with Figs. 1–4. In this position of the crank 60 with the valve 30 open, its cam portion 65 will extend laterally of the casing as best seen in Figs. 5 and 11. After the contents of the measure have been dispensed, the operator need only swing the spout laterally upwards towards the cam 65 and hook 66 as indicated in Fig. 5, and when the spout end 56 strikes the cam 65, it will drive the crank rearwardly until its lever portion 62 is free of bead 45. The spring 35 will then automatically turn the crank to its position shown in Fig. 8, and this rotational movement of the crank will simultaneously carry its hook portion 66 over and around the spout end 56 to a sufficient degree to establish the desired firm hold on the spout. This position of the crank hook 66 on the spout is illustrated from a variety of angles in Figs. 8, 9 and 10.

Figs. 12 and 13 illustrate the application of the present invention to a measure 70 which is of a type commonly provided for dispensing a relatively large measured volume of fluid. This measure 70 is shown as of essentially the same overall construction as the measure 50 except that its top 71 covers a part of the casing but is provided with a filling opening 72 below and behind the carrying handle 73. The crank 60 is shown as essentially identical with the crank 40 as already described, but in place of a bead 45 as on the measures described in connection with Figs. 1–10, a retainer 75 is provided for locking the crank in the open position of the valve. This retainer 75 is welded to the top 71 at the back of the filling opening 72, and its upper end projects above the top and includes a hole 76 for the crank 60 and a rearwardly extending flange 77 which serves as the cooperating locking member for the lever portion 62 of the crank. The operation of this measure is otherwise identical with that of the measure 50 and described in connection with Figs. 5–11. The measure 70 can also be constructed with a rigid spout of the type shown in Figs. 1–3, in which event it would be merely necessary to substitute an operating crank of the character shown at 40 in place of the crank 60, and such measures will have otherwise the operating characteristics described in connection with Figs. 1–4.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A liquid dispenser of the character described comprising a casing adapted to receive liquid contents for dispensing, said casing including a bottom having a discharge opening therein provided with spout means therebelow, a valve adapted to close said discharge opening from within said casing, means including a spring mounting said valve on said bottom with said spring biasing said valve to the closed position thereof, a crank mounted for rotational and limited axial movement on a horizontal axis in the upper portion of said casing, means including a link connecting said valve with said crank to exert a lifting force on said valve against said spring in response to rotational movement of said crank, and cooperating means on said crank and said casing responsive to axial movement of said crank following rotation thereof to the open position of said valve to lock said crank against further rotational movement in either direction and thereby to hold said valve open against said spring.

2. A liquid dispenser of the character described comprising a casing adapted to receive liquid contents for dispensing, said casing including a bottom having a discharge opening therein provided with spout means therebelow, a valve adapted to close said discharge opening from within said casing, means including a spring mounting said valve on said bottom with said spring biasing said valve to the closed position thereof, a crank mounted for rotational and limited axial movement on a horizontal axis in the upper portion of said casing, means including a link connecting said valve with said crank to exert a lifting force on said valve against said spring in response to rotational movement of said crank, said crank extending rearwardly through said casing and including a lever at the rearward end thereof adapted to extend upwardly in the position of said crank wherein said valve is closed, and said casing having a flange at the upper end thereof adapted to overlap said lever upon forward movement of said crank following rotation thereof to the open position of said valve to lock said crank against further rotational movement in either direction and thereby to hold said valve in locked position against said spring.

3. A liquid dispenser of the character described comprising a casing adapted to receive liquid contents for dispensing, said casing including a bottom having a discharge opening therein provided therebelow with an extended spout movable on said casing between a lowered discharge position and a raised inoperative position, a valve adapted to close said discharge opening from within said casing, means including a spring mounting said valve on said bottom with said spring biasing said valve to the closed position thereof, a crank mounted for rotational and limited axial movement on a horizontal axis in the upper portion of said casing, means including a link connecting said valve with said crank to exert a lifting force on said valve against said spring in response to rotational movement of said crank, cooperating means on said crank and said casing responsive to axial movement of said crank following rotation thereof to the open position of said valve to lock said crank against further rotational movement in either direction and thereby to hold said valve open against said spring, and said crank including a portion projecting at the front of said casing into the path of said spout to said inoperative position thereof for engagement by said spout causing rearward movement of said crank and resulting release of said locking means.

4. A liquid dispenser of the character described comprising a casing adapted to receive liquid contents for dispensing, said casing including a bottom having a discharge opening therein, a substantially rigid extended spout mounted on said bottom below said opening for hinged movement between a lowered discharge position and a raised inoperative position, a valve adapted to close said discharge opening from within said casing, means including a spring mounting said valve on said bottom with said spring biasing said valve to the closed position thereof, a crank mounted for rotational and limited axial movement on a horizontal axis in the upper portion of said casing, means including a link connecting said valve with said crank to exert a lifting force on said valve against said spring in response to rotational movement of said crank, cooperating means on said crank and said casing responsive to axial movement of said crank following rotation thereof to the open position of said valve to lock said crank against further rotational movement in either direction and thereby to hold said valve open against said spring, and said crank including a portion projecting at the front of said casing into the path of said spout to said inoperative position thereof for engagement by said spout causing rearward movement of said crank and resulting release of said locking means.

5. A liquid dispenser of the character described comprising a casing adapted to receive liquid contents for dispensing, said casing including a bottom having a discharge opening therein provided therebelow with an extended flexible spout movable on said casing between a lowered discharge position and a raised inoperative position, a valve adapted to close said discharge opening from within said casing, means including a spring mounting said valve on said bottom with said spring biasing said valve to the closed position thereof, a crank mounted for rotational and limited axial movement on a horizontal axis in the upper portion of said casing, means including a link connecting said valve with said crank to exert a lifting force on said valve against said spring in response to rotational movement of said crank, cooperating means on said crank and said casing responsive to axial movement of said crank following rotation thereof to the open position of said valve to lock said crank against further rotational movement in either direction and thereby to hold said valve open against said spring, said crank including a forward end portion extending beyond the front of said casing and forming a hook adapted to receive and retain the end of said spout in said inoperative position of said spout upon movement of said spout laterally of said casing into said hook, and said crank including a cam portion between said hook and said casing in the path of movement of said spout into said hook for engagement by said spout causing rearward movement of said crank and resulting release of said locking means.

6. A liquid dispenser of the character described comprising a casing adapted to receive liquid contents for dispensing, said casing including a bottom having a discharge opening therein provided with spout means therebelow, a valve adapted to close said discharge opening from within said casing, means including a spring mounting said valve on said bottom with said spring biasing said valve to the closed position thereof, a rod extending generally diametrically across the upper end of said casing through a pair of opposed holes in said casing for rotational movement, said rod having a loop in an intermediate portion thereof to form a crank, the forward end of said rod being arranged for sequential insertion through both said holes from the back of said casing for assembly thereof in said casing, a link directly connecting said loop with said valve to retain said crank in assembled position while providing for upward movement of said valve upon rotational movement of said crank, said crank extending rearwardly through said casing and including a lever at the rearward end thereof adapted to extend upwardly in the position of said crank wherein said valve is closed, and said casing having a flange at the upper end thereof adapted to overlap said lever upon forward movement of said crank following rotation thereof to the open position of said valve to lock said crank against further rotational movement and thereby to hold said valve in locked position against said spring.

7. A liquid dispenser of the character described comprising a casing adapted to receive liquid contents for dispensing, said casing including a bottom having a discharge opening therein provided therebelow with an extended spout movable on said casing between a lowered discharge position and a raised inoperative position, a valve adapted to close said discharge opening from within said casing, means including a spring mounting said valve on said bottom with said spring biasing said valve to the closed position thereof, a rod extending generally diametrically across the upper end of said casing through a pair of opposed holes in said casing for rotational movement, said rod having a loop in an intermediate portion thereof to form a crank, the forward end of said rod being arranged for sequential insertion through both said holes from the back of said casing for assembly thereof in said casing, a link directly connecting said loop with said valve to retain said crank in assembled position while providing for upward movement of said valve upon rotational movement of said crank, said crank extending rearwardly through said casing and including a lever at the rearward end thereof adapted to extend upwardly in the position of said crank wherein said valve is closed, said casing having a flange at the upper end thereof adapted to overlap said lever upon forward movement of said crank following rotation thereof to the open position of said valve to lock said crank against further rotational movement and thereby to hold said valve in locked position against said spring, and said crank including a portion projecting at the front of said casing into the path of said spout to said inoperative position thereof for engagement by said spout causing rearward movement of said crank and resulting release of said locking means.

8. A liquid dispenser of the character described comprising a casing adapted to receive liquid contents for dispensing, said casing including a bottom having a discharge opening therein, a substantially rigid extending spout mounted on said bottom below said opening for hinged movement between a lowered discharge position and a raised inoperative position, a valve adapted to close said discharge opening from within said casing, means including a spring mounting said valve on said bottom with said spring biasing said valve to the closed position thereof, a rod extending generally diametrically across the upper end of said casing through a pair of opposed holes in said casing for rotational movement, said rod having a loop in an intermediate portion thereof to form a crank, the forward end of said rod being arranged for sequential insertion through both said holes from the back of said casing for assembly thereof in said casing, a link directly connecting said loop with said valve to retain said crank in assembled position while providing for upward movement of said valve upon rotational movement of said crank, the forward end of said crank being turned over to form a cam spaced to provide for limited axial movement of said crank, cooperating means on the rearward end of said crank and said casing responsive to forward axial movement of said crank following rotation thereof to the open position of said valve to lock said crank against further rotational movement and thereby to hold said valve open against said spring, and said cam being located to project into the path of said spout to said inoperative position thereof for engagement by said spout causing rearward movement of said crank and resulting release of said locking means.

9. A liquid dispenser of the character described comprising a casing adapted to receive liquid contents for dispensing, said casing including a bottom having a discharge opening therein, an extended flexible spout mounted on said bottom below said casing for flexing movement between a lowered discharge position and a raised position, a valve adapted to close said discharge opening from within said casing, means including a spring mounting said valve on said bottom with said spring biasing said valve to the closed position thereof, a rod extending generally diametrically across the upper end of said casing through a pair of opposed holes in said casing for rotational and limited axial movement, said rod having a loop in an intermediate portion thereof to form a crank, a link directly connecting said loop with said valve to provide for upward movement of said valve upon rotational movement of said crank, cooperating means on said crank and said casing responsive to axial movement of said crank following rotation thereof to the open position of said valve to lock said crank against further rotational movement and thereby to hold said valve open against said spring, said crank including a forward end portion extending beyond the front of said casing and forming a hook adapted to receive and retain the end of said spout in said inoperative position of said spout upon movement of said spout laterally of said casing into said hook, and said crank including a cam portion between said hook and said casing in the path of movement of said spout into said hook for engagement by said spout causing rearward movement of said crank and resulting release of said locking means, and said hook and said cam portions of said crank being generally helically curved to provide for sequential insertion thereof through both said holes from the back of said casing for assembly of said crank in said casing.

References Cited in the file of this patent
UNITED STATES PATENTS

| | | |
|---|---|---|
| 99,407 | Clark | Feb. 1, 1870 |
| 1,195,102 | Schmidt | Aug. 15, 1916 |
| 1,946,978 | Lien | Feb. 13, 1934 |
| 2,067,554 | Vahle | Jan. 12, 1937 |
| 2,303,690 | Hall et al. | Dec. 1, 1942 |